(12) United States Patent
Shimazu

(10) Patent No.: US 10,704,947 B2
(45) Date of Patent: Jul. 7, 2020

(54) AIRFLOW MANAGEMENT DEVICE INCLUDING A SLANTED PASSAGE AND A BRANCHING PASSAGE BETWEEN TWO PLATES SUPPORTED BY PILLARS

(71) Applicant: Yuki Shimazu, Tokyo (JP)

(72) Inventor: Yuki Shimazu, Tokyo (JP)

(73) Assignee: MINEBEA MITSUMI INC., Nagano (JP)

( * ) Notice: Subject to any disclaimer, the term of this patent is extended or adjusted under 35 U.S.C. 154(b) by 119 days.

(21) Appl. No.: 16/184,135

(22) Filed: Nov. 8, 2018

(65) Prior Publication Data
US 2019/0154489 A1 May 23, 2019

(30) Foreign Application Priority Data

Nov. 20, 2017 (JP) .................................. 2017-222640

(51) Int. Cl.
G01F 1/68 (2006.01)
G01F 15/18 (2006.01)
G01F 15/04 (2006.01)
G01F 5/00 (2006.01)
G01F 1/684 (2006.01)
G01F 1/692 (2006.01)

(52) U.S. Cl.
CPC ............ *G01F 15/185* (2013.01); *G01F 1/684* (2013.01); *G01F 1/692* (2013.01); *G01F 5/00* (2013.01); *G01F 15/04* (2013.01)

(58) Field of Classification Search
None
See application file for complete search history.

(56) References Cited

U.S. PATENT DOCUMENTS

| 5,467,648 A * | 11/1995 | Igarashi | G01F 5/00 73/202.5 |
| 6,886,401 B2 * | 5/2005 | Ito | G01F 1/6842 73/202 |
| 7,549,332 B2 * | 6/2009 | Yamashita | G01F 1/6842 73/204.21 |
| 7,698,938 B2 * | 4/2010 | Inagaki | G01F 1/6842 73/204.21 |

(Continued)

FOREIGN PATENT DOCUMENTS

| EP | 2824459 | 1/2015 |
| JP | H04-295767 | 10/1992 |
| JP | 2013-185937 | 9/2013 |

*Primary Examiner* — Harshad R Patel
(74) *Attorney, Agent, or Firm* — IPUSA, PLLC

(57) ABSTRACT

An air flow measurement device includes a first channel plate, a second channel plate facing the first channel plate, a pillar fixing the second channel plate with respect to the first channel plate so as to form a space of a given size between the first channel plate and the second channel plate, a slanted channel formed in the space which is configured to become narrower toward a center portion of the air flow measurement device, a branching passage arranged in the center portion which communicates with the slanted channel, a projection provided in the branching passage so as to partly narrow the branching passage, and an air flow sensor provided in the space. The air flow sensor is arranged at a position higher than a junction between the branching passage and the slanted channel.

8 Claims, 12 Drawing Sheets

(56) References Cited

U.S. PATENT DOCUMENTS

| | | | | |
|---|---|---|---|---|
| 7,886,593 B2* | 2/2011 | Inagaki | ............... | G01F 1/6842 |
| | | | | 73/203 |
| 8,104,340 B2* | 1/2012 | Speldrich | ............... | G01F 1/72 |
| | | | | 73/202.5 |
| 8,182,143 B2* | 5/2012 | Fleming | ............... | G01K 13/028 |
| | | | | 374/138 |
| 8,573,051 B2* | 11/2013 | Ueda | ............... | G01F 5/00 |
| | | | | 73/202 |
| 2005/0081620 A1* | 4/2005 | Ito | ............... | G01F 1/698 |
| | | | | 73/202.5 |
| 2005/0183500 A1* | 8/2005 | Kanouda | ............... | G01F 5/00 |
| | | | | 73/202.5 |

* cited by examiner

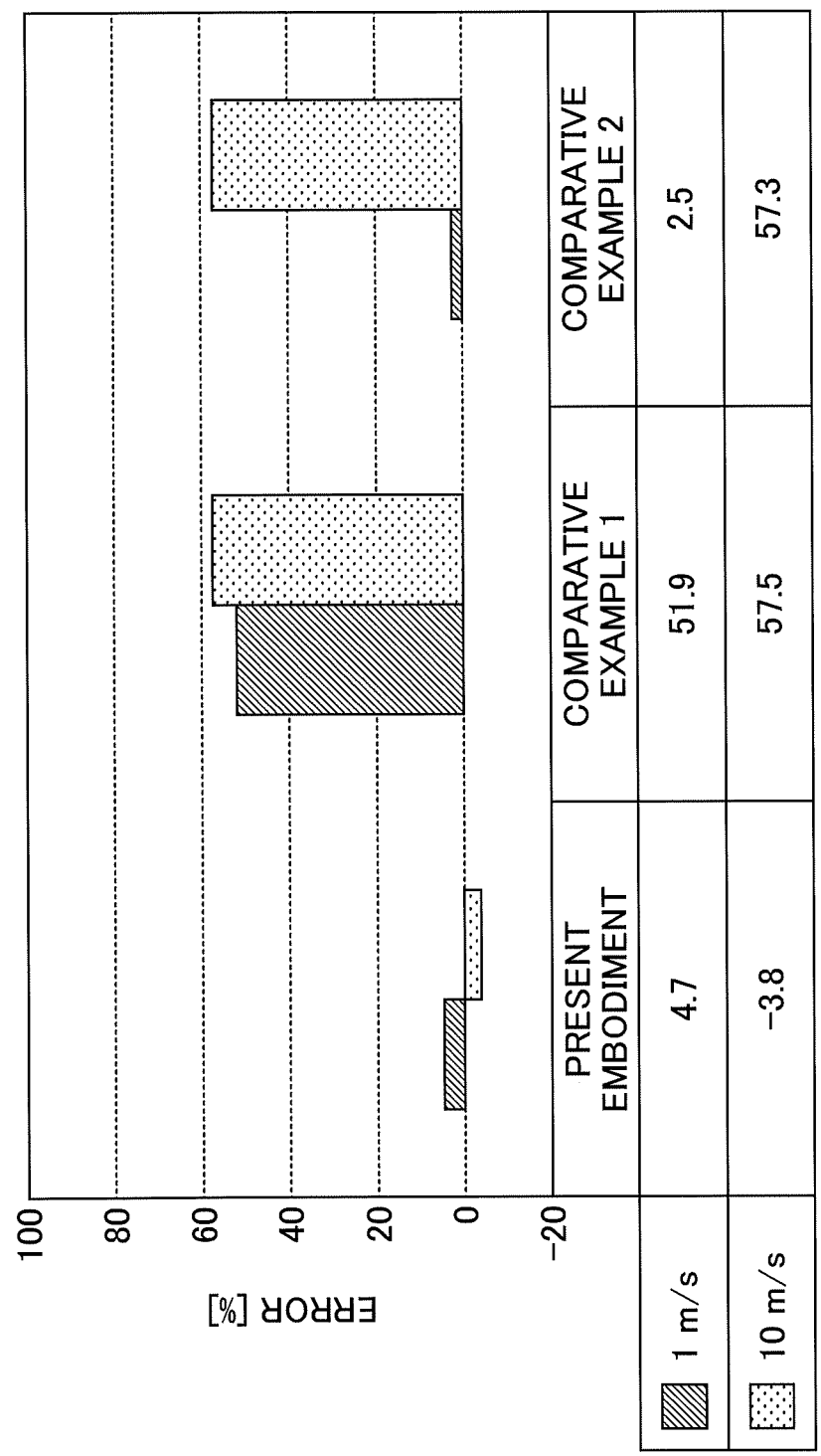

AIRFLOW MANAGEMENT DEVICE INCLUDING A SLANTED PASSAGE AND A BRANCHING PASSAGE BETWEEN TWO PLATES SUPPORTED BY PILLARS

CROSS-REFERENCE TO RELATED APPLICATION

This application is based on and claims priority to Japanese Patent Application No. 2017-222640 filed on Nov. 20, 2017, the entire contents of which are incorporated herein by reference.

BACKGROUND OF THE INVENTION

1. Field of the Invention

The present invention relates to an air flow measurement device and an environment measurement apparatus using the same.

2. Description of the Related Art

Various types of flow measurement technology, such as a thermal mass flow meter, Karman's vortex flow meter, or a mass flow meter utilizing ultrasonic wave or Doppler effect, have been invented. In the technique utilizing a relationship between a quantity of heat taken from a heating element and a mass flow rate, a mass flow rate can be directly measured from a sensor contacting the fluid. Thus, this technique is an easy method.

A structure of a fluid detecting device as illustrated in FIG. 1 is known. In the fluid detecting device, a channel is formed between two circular fluid guide plates that are separated by spacers (pillars) 107, and fluid is detected by detecting elements 101 and 102 provided in the channel (see Patent Document 1, for example). To reduce the effect of fluid turbulence, surfaces of the fluid guide plates, which face each other, are curved, and the detecting elements 101 and 102 are disposed at a narrowed location in the channel.

Further, a fluid measurement apparatus for measuring velocity and/or direction of fluid in all directions is known (see Patent Document 2, for example). In the fluid measurement apparatus, annular centrifugal separation channel units each having a different radius are provided around a fluid detector, in order to prevent dust in the fluid from adhering to the fluid detector.

In the fluid detecting device illustrated in FIG. 1, the effect of the pillars, which support the fluid guide plates facing each other, is not sufficiently considered. If a pillar is present in a path in which fluid flows to a sensor, flow separation occurs because of the pillar. Even in the fluid measurement apparatus capable of measuring in all directions, a measured value when a pillar is present in a path of fluid becomes different from a measured value when the pillar is not present in the path of fluid. Effect of flow separation or turbulence becomes more remarkable as a velocity of fluid becomes larger. However, a relationship between fluid turbulence caused by a pillar and a variation of characteristics caused by the fluid turbulence has not been sufficiently considered.

Possible approaches for reducing the effect of fluid turbulence include reducing a diameter of a pillar, and disposing a pillar at a remote location from a detecting element. However, if a diameter of a pillar is reduced, mechanical strength degrades. Also, if a pillar is disposed at a remote location from a detecting element, a size of a fluid path becomes larger, and a size of an apparatus becomes larger.

CITATION LIST

Patent Document

[Patent Document 1] Japanese Laid-open Patent Application Publication No. 04-295767
[Patent Document 2] Japanese Patent No. 5817598

SUMMARY OF THE INVENTION

The present invention aims at providing an air flow measuring device that can reduce a difference of measured values depending on inflow directions of the fluid, in all directions.

To solve the above mentioned problem, an air flow measurement device according to an embodiment of the present disclosure includes a first channel plate, a second channel plate arranged above the first channel plate so as to face the first channel plate, a pillar fixing the second channel plate with respect to the first channel plate so as to form a space of a given size between the first channel plate and the second channel plate, a slanted channel formed in the space which is configured to become narrower toward a center portion of the air flow measurement device, a branching passage arranged in the center portion which communicates with the slanted channel, a projection provided in the branching passage so as to partly narrow the branching passage, and an air flow sensor. On at least one of a surface of the first channel plate facing the second channel plate and a surface of the second channel plate facing the first channel plate, a slope for forming the slanted channel is formed, and the air flow sensor is arranged at a position higher than a junction between the branching passage and the slanted channel such that a surface of the air flow sensor faces the space.

According to an aspect of the present invention, a difference of measured values depending on inflow directions of fluid in an air flow measurement device can be reduced in all directions.

BRIEF DESCRIPTION OF THE DRAWINGS

FIG. 6 is a graph illustrating an effect of the air flow measurement device according to the present embodiment.

DETAILED DESCRIPTION OF THE PREFERRED EMBODIMENTS

In an embodiment of the present disclosure, a difference of measured values depending on inflow directions of air to a sensor will be reduced, without increasing a size of an air flow measurement device. To realize the above, a shape of a channel is designed such that velocity of air flowing into a sensor from all directions becomes substantially equal. In the present embodiment, "air" includes ambient air, gas of a specific material, and exhaust gas. In the following, a specific embodiment of the air flow measurement device will be described with reference to drawings.

Figure 1:
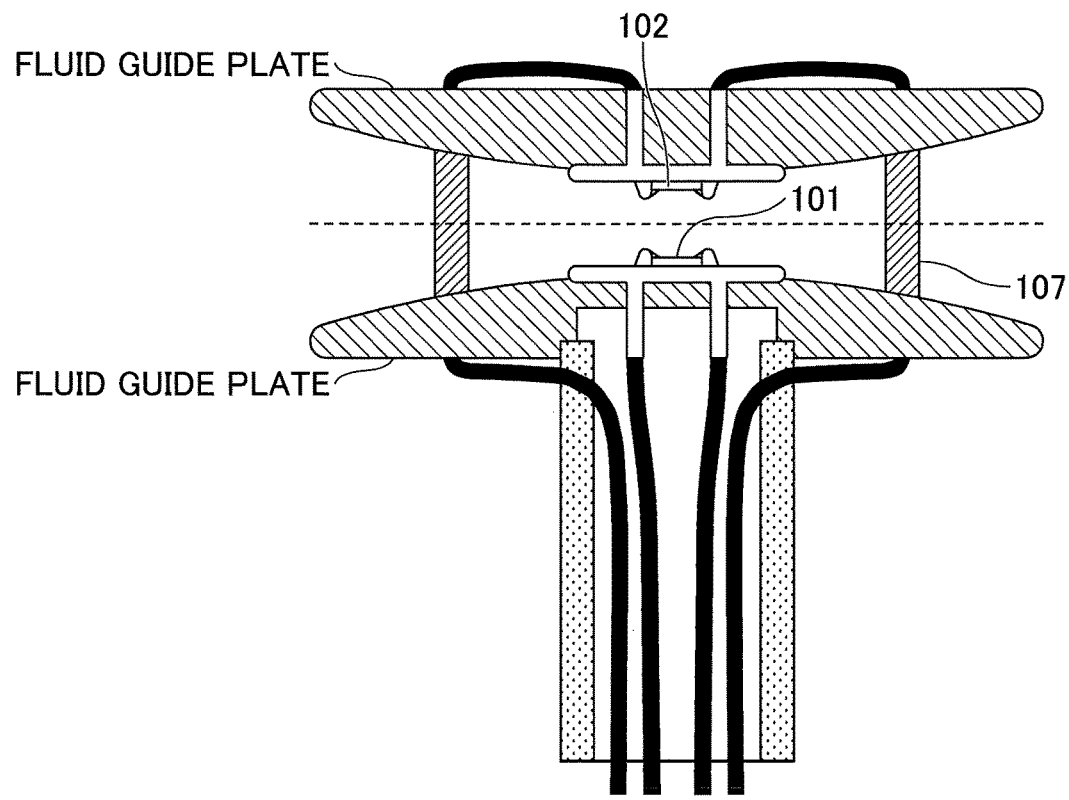
FIG. 1 is a diagram illustrating a configuration of a fluid detecting device according to a related art.
Figure 2:
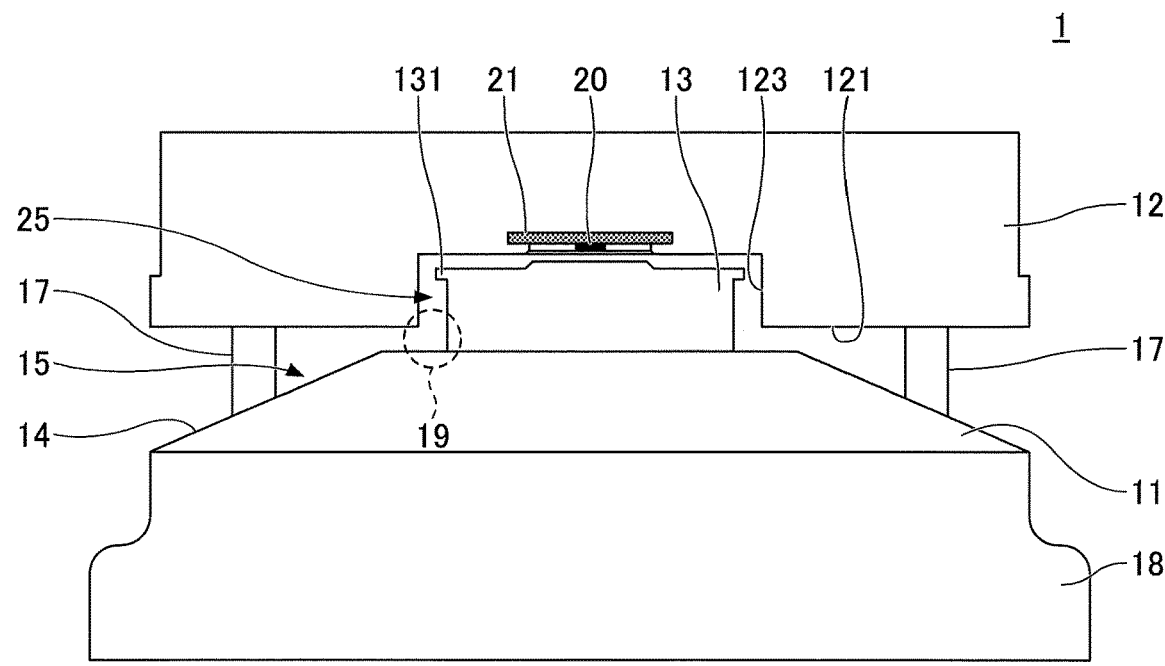
FIG. 2 is a diagram illustrating an outline of a cross section of an air flow measurement device according to an embodiment.

FIG. 2 is a diagram illustrating an outline of a cross section of the air flow measurement device 1 according to the present embodiment. The air flow measurement device 1 includes a first channel plate 11, a second channel plate 12, an air flow sensor 20, and multiple pillars 17. The air flow sensor 20 faces a channel formed by the first channel plate 11 and the second channel plate 12, and the air flow sensor 20 is positioned at a substantially central location of a surface of the channel. Because of the pillars 17, the first channel plate 11 and the second channel plate 12 are fixed while a predetermined space is kept between the first channel plate 11 and the second channel plate 12. The air flow sensor 20 is disposed such that a detection surface of the air flow sensor 20 is in contact with a space of the channel.

A main portion of the air flow measurement device 1 is formed on a base plate 18. Generally, the air flow measurement device 1 is used in a state in which the base plate 18 is placed on a horizontal surface. A mounting surface of the air flow sensor 20 is preferably in parallel with the horizontal surface. The first channel plate 11 may be formed integrally with the base plate 18, or the first channel plate 11 and the base plate 18 may be formed as separate parts.

At least one of the first channel plate 11 and the second channel plate 12 has a slope 14 on its surface, which is one of the features of the present embodiment. The slope 14 is inclined such that an outer side of the slope 14 is positioned further from an opposing surface than an inner side of the slope 14. In the example illustrated in FIG. 2, the slope 14 is provided on the first channel plate 11, but the second channel plate 12 does not have a slope, and an opposing surface 121 of the second channel plate 12 that faces the first channel plate 11 is in parallel with the mounting surface of the air flow sensor 20.

By the slope 14 of the first channel plate 11 and the opposing surface 121 of the second channel plate 12, a slanted channel 15 is formed. The slanted channel 15 is an inflow/outflow passage for inputting fluid (air) into the air flow measurement device 1 from surroundings and exhausting the air to the surroundings.

A second feature of the present embodiment is that a projection is provided in a branching passage 25 communicating with the slanted channel 15, so as to partly narrow the branching passage 25. The air flow sensor 20 is disposed at a position higher than a communicating part (junction) 19 at which the slanted channel 15 communicates with the branching passage 25, in a height direction of the air flow measurement device 1. In the example illustrated in FIG. 2, the projection is formed, as a flange 131, on a circumference of a step (stage 13) disposed on the first channel plate 11, so as to project horizontally (in a direction parallel with the mounting surface of the air flow sensor 20).

The stage 13 is for example a cylindrical step, and the flange 131 is formed along a circumference of an upper surface of the stage 13. Flat surface parts of the first channel plate 11 and the second channel plate 12 may be formed to be circular shapes which are coaxial with the stage 13, in order to be adapted to the shape of the stage 13.

The second channel plate 12 has a recess 123 at a center of the opposing surface 121 facing the first channel plate 11. The stage 13 is housed in the recess 123 while keeping space between the second channel plate 12 and an outer surface of the stage 13.

From a base of the stage 13 toward an outer circumference of the first channel plate 11, the frustum shaped slope 14 is formed. A space between the slope 14 and the opposing surface 121 of the second channel plate 12 corresponds to the slanted channel 15. The slanted channel 15 becomes narrower toward the stage 13 (that is, a cross section of the slanted channel 15 becomes smaller toward the stage 13), and communicates with the branching passage 25 at the base of the stage 13. The branching passage 25 is formed between the stage 13 and the recess 123 of the second channel plate 12.

As will be described below, because the air flow measurement device 1 is provided with the slope 14 and a projection (such as the flange 131) projecting in the branching passage 25, velocity of air flowing into the air flow sensor 20 from all directions is equalized to the extent possible, and an error of a measured value is reduced.

Figure 3A:
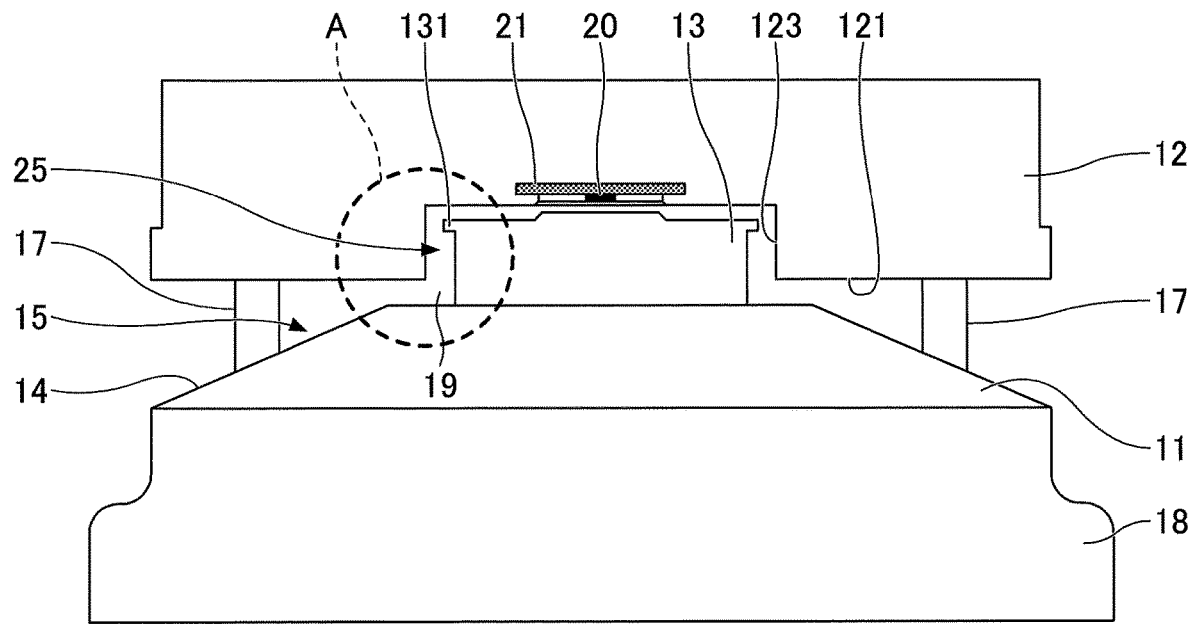
FIGS. 3A and 3B are enlarged views of a main portion of the air flow measurement device in FIG. 2.
Figure 3B:
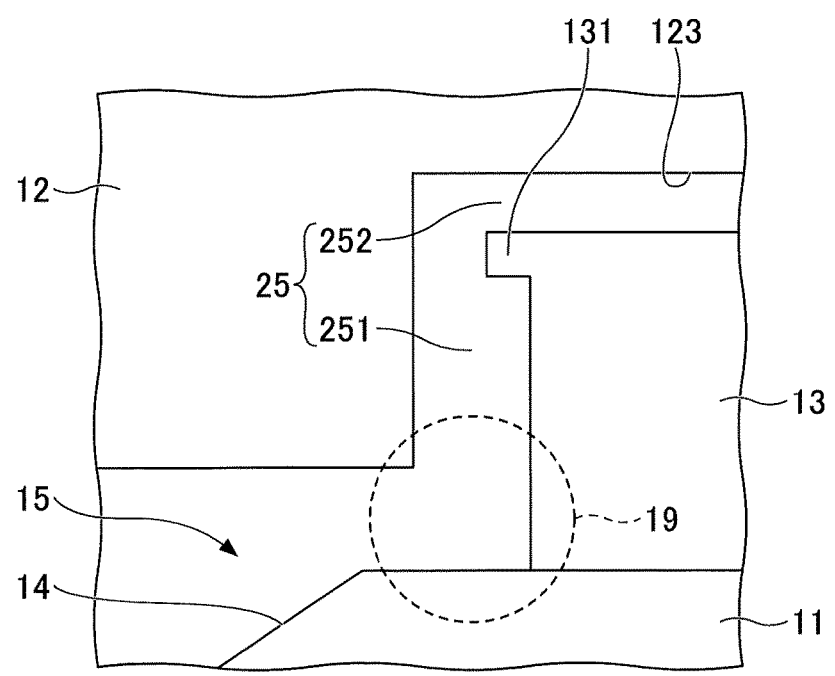

FIG. 3B is an enlarged view of a main portion of the air flow measurement device 1. FIG. 3B is an enlarged view of a region A in a diagram of the air flow measurement device 1 illustrated in FIG. 3A. The slanted channel 15 having the slope 14 communicates with the branching passage 25 at the communicating part 19 at the base of the stage 13. The branching passage 25 includes a vertical path 251 which passes between a side surface of the stage 13 and the recess 123 of the second channel plate 12, and a horizontal path 252 which passes between an upper surface of the stage 13 and the recess 123.

The flange 131 of the stage 13 projects in a space between the vertical path 251 and the horizontal path 252. Thus, a size of the branching passage 25 is narrowed by the flange 131 to a certain extent.

The air flow sensor 20 attached to a substrate 21 is disposed above the communicating part 19 of the slanted channel 15 and the branching passage 25 in a height direction of the air flow measurement device 1, so as to face the branching passage 25. In the example illustrated in FIG. 2 or FIGS. 3A and 3B, the air flow sensor 20 is disposed in the recess 123 of the second channel plate 12 such that a detection surface of the air flow sensor 20 is in contact with the horizontal path 252. Accordingly, fluid (air) introduced into the air flow measurement device 1 from the slanted channel 15 passes through the branching passage 25 from the communicating part 19. The fluid passing through the branching passage 25 contacts the air flow sensor 20. After contacting the air flow sensor 20, the fluid flows toward the slanted channel 15 via an opposite end of the branching passage 25, and is expelled out of the air flow measurement device 1.

Figure 4:
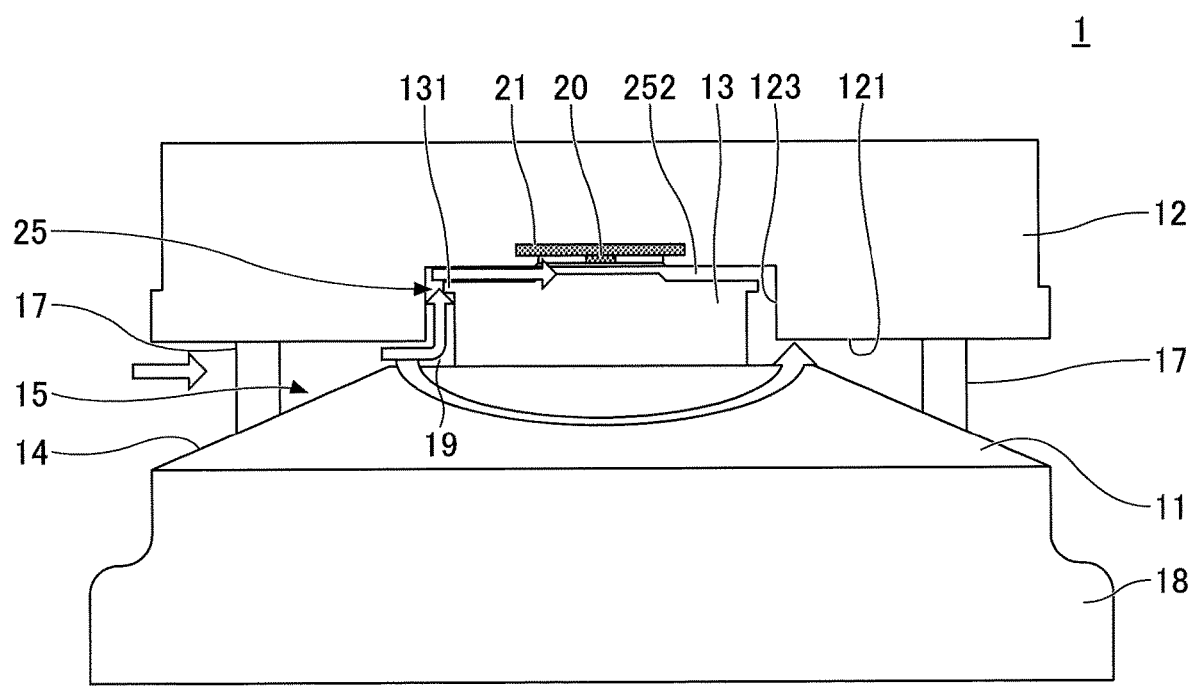
FIG. 4 is a diagram illustrating how air flows in the air flow measurement device in FIG. 2.

FIG. 4 is a diagram illustrating how air flows in the air flow measurement device 1. Air coming from a gap between the pillars 17 flows toward the center of the air flow measurement device 1, through the slanted channel 15. The slanted channel 15 becomes narrower toward the center. Part of the air flows toward an opposite side of the slanted channel 15 along the slope 14, and the other part of the air flows into the branching passage 25 from the communicating part 19.

In a case in which air enters the air flow measurement device 1 by passing between any two pillars 17, little turbulence occurs in the air, and the air in an unchanged condition is detected by the air flow sensor 20. In a case in which air strikes in front of the pillar 17, flow separation occurs at the pillar 17 and turbulence occurs at an inner side of the pillar 17 (at a side closer to a center of the air flow measurement device 1). Thus, in a conventional structure, because error occurs in an output of an air flow sensor, it is difficult to measure an airflow direction or a flow velocity accurately in all directions.

Conversely, in the air flow measurement device 1 according to the present embodiment, because the slope 14 is provided at the inflow/outflow passage, the inflow/outflow passage is configured as the slanted channel 15. Because both air striking in front of the pillar 17 and air passing between any two pillars 17 move along the slope 14, airflow is equalized to a certain extent (equalization at a first stage).

An angle of the slope 14 may be designed such that a flow velocity or a flow rate is equalized in all directions, in accordance with the environment in which the air flow measurement device 1 is used, a range of a flow velocity or a flow rate to be measured, sensitivity of the air flow sensor 20, and the like. For example, the angle of the slope 14 to a horizontal plane is between 20 degrees and 60 degrees, and more preferably between 30 degrees and 45 degrees. In a case in which the angle of the slope 14 is too small, a difference in turbulence effects caused by a difference in directions of incoming air cannot be reduced. In a case in which the angle of the slope 14 is too large, a size of the air flow measurement device 1 becomes larger in a height direction, and it is difficult to stably place the air flow measurement device 1.

Air introduced into the air flow measurement device 1 flows into the branching passage 25 from the slanted channel 15, and flows upward along a side surface of the stage 13. Thus, a variation of a flow velocity or a flow rate caused by the effect of the pillars 17 and the like is further reduced. Also, because the air enters the horizontal path 252 from the vertical path 251 by moving around the flange 131, airflow is further equalized (equalization at a second stage).

In the present embodiment, air that has flowed upward along the side surface of the stage 13 first flows toward the outside along a bottom surface of the flange 131, and enters the horizontal path 252 from a gap between the flange 131 and a side surface of the recess 123. By passing through the above mentioned path, because a variation of velocity of air introduced into the air flow measurement device 1 depending on a difference of incoming direction of air is reduced, a measurement error can be minimized in all directions.

A secondary effect of providing the flange 131 is that water droplets or dust is prevented from entering the horizontal path 252 in which the air flow sensor 20 is placed.

As a projection projecting in the branching passage 25, instead of the flange 131 extending horizontally, a projecting wall extending vertically may be provided at an outer circumference of the stage 13. In this case, a size of the branching passage 25 is narrowed at an entrance/exit of the horizontal path 252. Air that has flowed upward along the side surface of the stage 13 climbs over the projecting wall, and enters the horizontal path 252. Accordingly, because a variation of a flow velocity, depending on presence or absence of the pillar 17 or turbulence, is equalized in all directions, a measurement error depending on an incoming direction of air is reduced.

By providing the flange 131, velocity of air detected by the air flow sensor 20 is reduced slightly as compared with a case in which a flange 131 is not present. However, by measuring a difference of flow velocities between a case in which the flange 131 is present and a case in which the flange 131 is not present in advance, and by performing calibration based on the measured result, a correct flow velocity can be calculated and output from a result detected by the air flow sensor 20. Also, when a vertical projecting wall is provided instead of the flange 131, velocity of air detected by the air flow sensor 20 is reduced slightly as compared with a case in which a vertical projecting wall is not present. Also in this case, by performing calibration in advance, a correct flow velocity can be output.

Figure 5A:
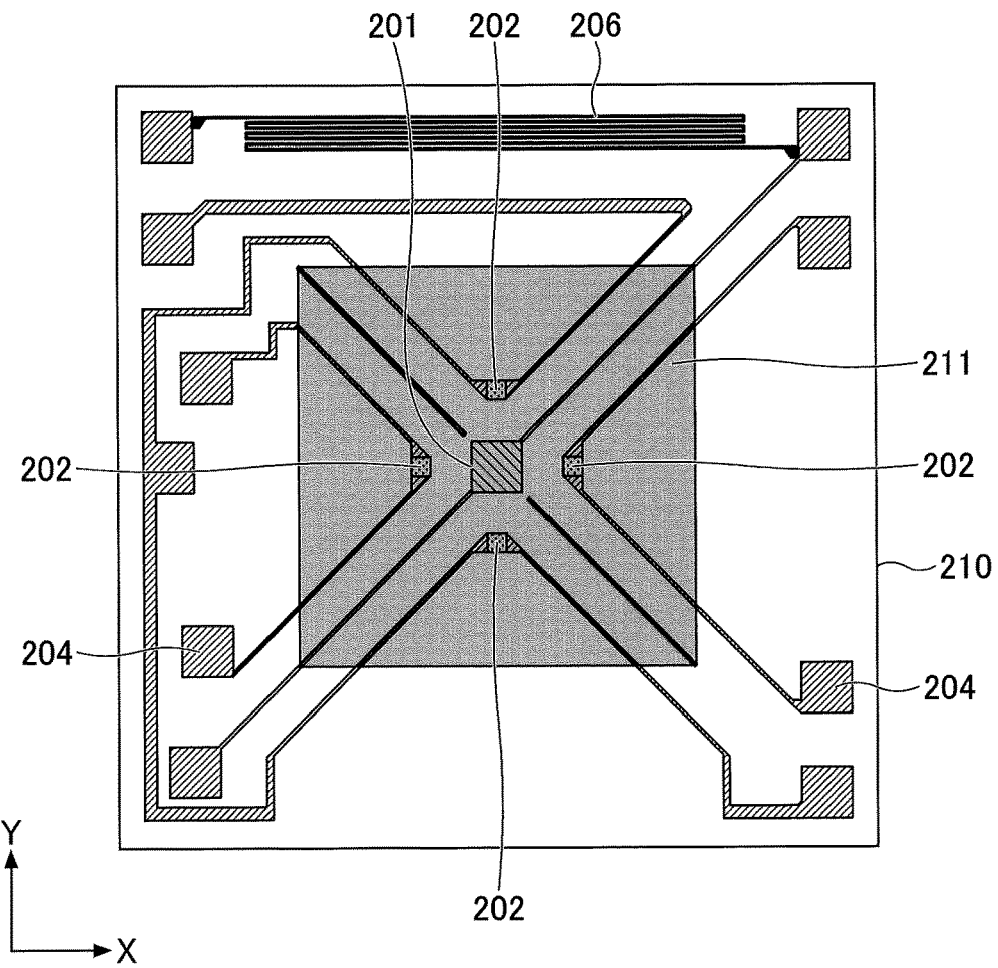
FIGS. 5A and 5B are diagrams illustrating an example of a configuration of an air flow sensor used in the air flow measurement device.
Figure 5B:
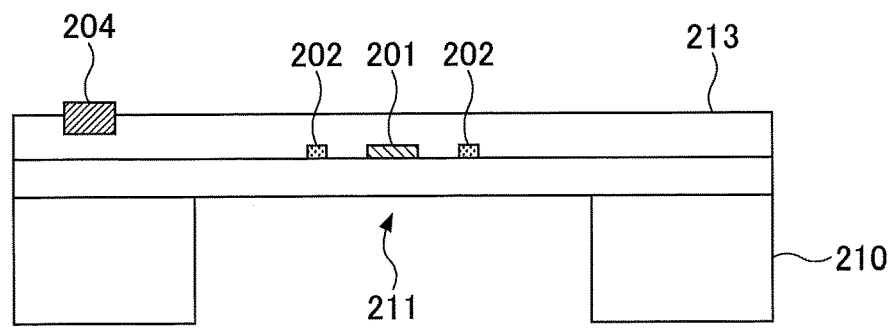

FIG. 5A and FIG. 5B are diagrams illustrating an example of a configuration of the air flow sensor 20 used in the air flow measurement device 1. FIG. 5A is a plan view of the air flow sensor 20, and FIG. 5B is a cross sectional view of the air flow sensor 20. The air flow sensor 20 includes a heating resistor element 201 and multiple temperature detecting elements 202 disposed in surroundings of the heating resistor element 201. Both the heating resistor element 201 and the temperature detecting elements 202 are disposed on a diaphragm 211 formed on a chip substrate 210. The chip substrate 210 is a semiconductor substrate such as silicon which can be processed easily by etching. The diaphragm 211 is multi-layered insulating film. A semiconductor layer may be included at the bottom of the multi-layered insulating film.

The multiple temperature detecting elements 202 are uniformly arranged around the heating resistor element 201, in order to detect a direction of airflow and a flow velocity. In the example illustrated in FIG. 5A, a pair of the temperature detecting elements 202 and another pair of the temperature detecting elements 202 are arranged orthogonally. In this case, temperature distribution in an X-direction may be detected by a pair of the temperature detecting elements 202 arranged in the X-direction, and temperature distribution in a Y-direction may be detected by a pair of the temperature detecting elements 202 arranged in the Y-direction.

The heating resistor element 201 is formed from platinum (Pt), nichrome (NiCr), molybdenum disilicide ($MoSi_2$), tungsten disilicide ($WSi_2$), polysilicon, or the like. The temperature detecting elements 202 are formed from vanadium oxide, for example. The heating resistor element 201 and each of the temperature detecting elements 202 are electrically connected to a corresponding pair of electrode pads 204, and the entirety of the heating resistor element 201 and the entirety of each of the temperature detecting elements 202 are covered with protecting film 213.

The electrode pad 204 is formed on the chip substrate 210 outside the diaphragm 211, and is exposed from the protecting film 213. A temperature sensor 206 that is connected to an external bridge circuit is provided on the chip substrate 210.

When the heating resistor element 201 is heated by applying electric current to the heating resistor element 201, a temperature of the diaphragm 211 increases. In a case in which fluid (air) is not flowing in a space contacting with the air flow sensor 20, temperature distribution of the diaphragm 211 is uniform, and outputs of the temperature detecting elements 202 in a pair that face each other across the heating resistor element 201 are balanced with each other.

When fluid (air) flows in the space contacting with the air flow sensor 20, temperature becomes higher in the downstream air than in the upstream air. That is, temperature distribution occurs in the diaphragm 211, and voltage values obtained from the temperature detecting elements 202 via the electrode pads vary. Based on a direction of change of voltage and a rate of voltage change, a direction of airflow and a flow velocity can be calculated.

The air flow sensor 20 is die-bonded on the substrate 21 with an adhesive agent or the like. The chip substrate 210 is electrically connected to the substrate 21 by using a wire bonding and/or a penetrating via. The substrate 21 is arranged in a center of the air flow measurement device 1 such that an element surface of the air flow sensor 20 faces an airflow path (such as the horizontal path 252 of the branching passage 25) at a position higher than the slanted channel 15.

In a conventional channel structure, depending on presence/absence of a pillar in a direction of air flowing into an air flow sensor, a difference (error) of temperature distribution occurs because of a difference of effect of turbulence. Thus, error occurs in an output value of the air flow sensor. In the air flow measurement device 1 according to the present embodiment, by the slope 14 of the slanted channel 15 and by the flange 131 provided at the branching passage 25, airflow is equalized in two stages. Accordingly, because a variation of a flow velocity depending on a difference of incoming direction of air is reduced, measurement error can be minimized in all directions.

FIG. 6 is a graph illustrating an effect of a slope structure (the slope 14 of the slanted channel 15) of the air flow measurement device 1 according to the present embodiment. In FIG. 6, in addition to a result with respect to the air flow measurement device 1 according to the present embodiment, results with respect to two air flow measurement devices not having slope structures are also illustrated as comparative examples. A vertical axis in FIG. 6 represents a measured error (%) (may also be referred to as a measured error caused by presence of a pillar). The "measured error" in the present disclosure means a difference (which is represented as a percentage) between an output value (of an air flow sensor) in a case in which a pillar exists on a flow path of air flowing into an air flow measurement device and an output value in a case in which a pillar does not exist on the flow path. Based on an output value of an air flow sensor in a case in which velocity of air introduced from a gap between two adjacent pillars is measured, a difference between an output value of the air flow sensor in a case in which velocity of air striking in front of a pillar is measured and the output value of the air flow sensor in a case in which velocity of air introduced from the gap between the two adjacent pillars is measured is expressed as a percentage.

With respect to an air flow measurement device having a slope structure according to the present embodiment, an air flow measurement device according to a comparative example 1 not having a slope structure, and an air flow measurement device according to a comparative example 2 not having a slope structure, an experiment for measuring a flow velocity was performed and a calculation of a measured error when a flow velocity is 1 m/s and a calculation of a measured error when a flow velocity is 10 m/s were performed. Note that the experiment was performed by simulation.

Figure 7A:
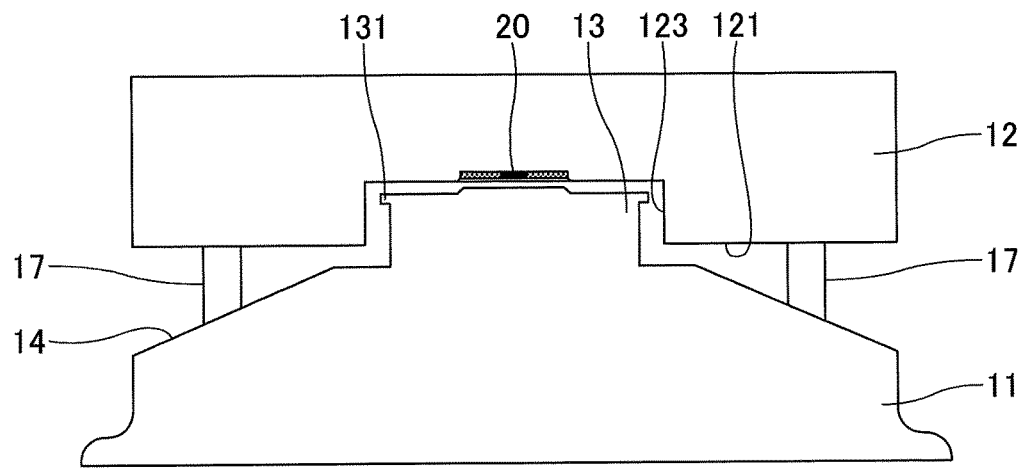
FIGS. 7A to 7C are schematic diagrams of three air flow measurement devices used in simulation.
Figure 7B:
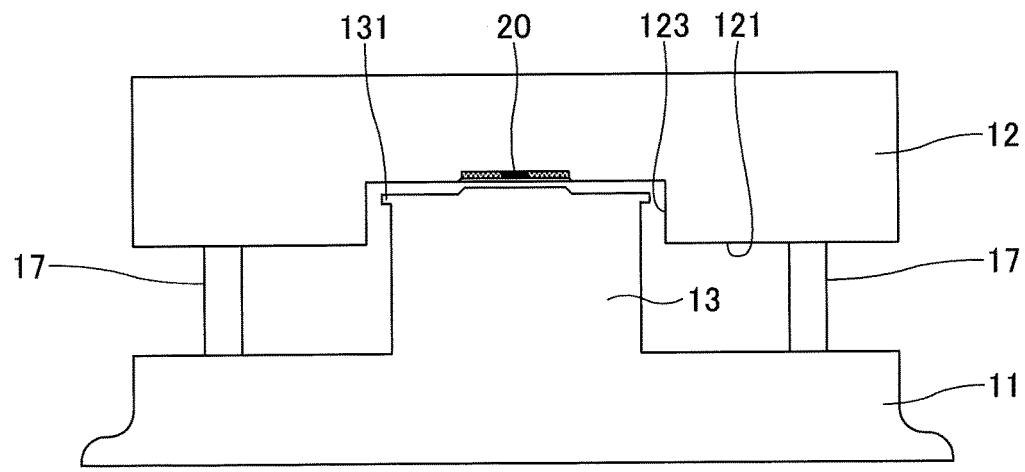
Figure 7C:
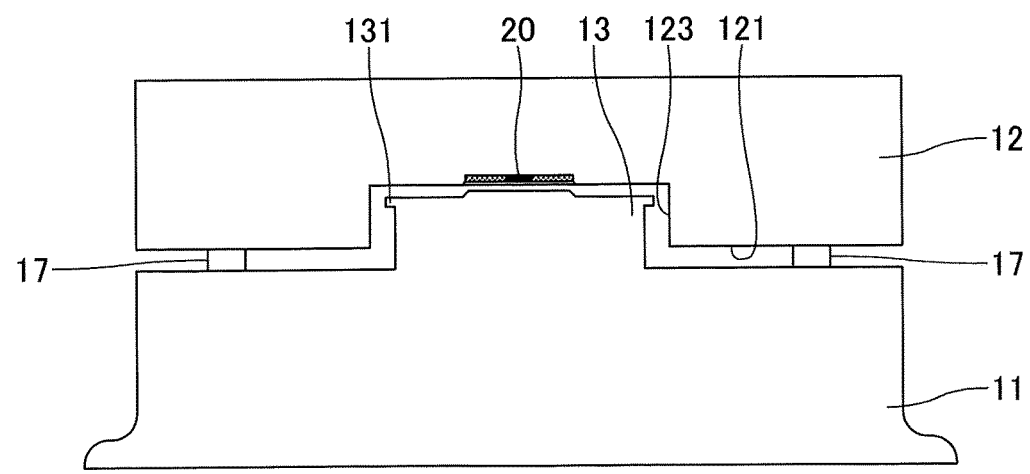

FIGS. 7A to 7C are schematic diagrams of three air flow measurement devices which have been used in simulations in FIG. 6. FIG. 7A illustrates the air flow measurement device 1 having the slope structure according to the present embodiment, FIG. 7B illustrates the air flow measurement device according to the comparative example 1 not having a slope structure, and FIG. 7C illustrates the air flow measurement device according to the comparative example 2 not having a slope structure. A difference between the comparative example 1 and the comparative example 2 is a volume of an inflow/outflow passage. As the inflow/outflow passage of the comparative example 1 is larger than that of the comparative example 2, air is more easily introduced to an air flow sensor from outside.

Except for presence/absence of a slope structure and the above mentioned difference between the comparative example 1 and the comparative example 2, conditions of the above three air flow measurement devices are the same. Thus, all the air flow measurement devices illustrated in FIGS. 7A to 7C are equipped with flanges 131 at stages 13 in central positions. In the simulation, a diameter of the first channel plate 11 and a diameter of the second channel plate 12 were set to 43 mm, and a diameter of the cylindrical stage 13 was set to 14 mm. A size of the air flow sensor 20 was set to 1.5 mm×1.5 mm, and as pillars 17, 8 columns each having a diameter of 2 mm were arranged at regular intervals.

Referring back to FIG. 6, in the air flow measurement device 1 having the slope structure according to the present embodiment, a measured error caused by presence of a pillar is within ±5% when a flow velocity is 1 m/s and when a flow velocity is 10 m/s. Conversely, in the comparative example 1 (in the air flow measurement device in FIG. 7B), regardless of whether a flow velocity is small or large, a measured error caused by presence of a pillar exceeds 50%. When a flow velocity is large, the measured error is close to 60%. The reason may be as follows. As the inflow/outflow passage is large, if a pillar exists on a flow path, effect of flow separation or turbulence caused by the pillar directly appears on the measured result.

In the comparative example 2, when a flow velocity is small (1 m/s), a measured error is small (approximately 2 to 3%). However, when a flow velocity is large, the measured error becomes close to 60%, similar to the comparative example 1. By narrowing the inflow/outflow passage and providing the flange 131, with respect to airflow entering slowly, a variation of flow velocities can be suppressed in all directions. However, when a flow velocity is large, the effect of a pillar becomes large. In a case in which air having high speed flows toward an air flow sensor by striking in front of a pillar, turbulence occurs and a measured error becomes large.

According to the result illustrated in FIG. 6, by configuring an inflow/outflow passage of air to be a slanted channel that becomes narrower toward a center, effect of turbulence caused by the pillar 17 can be reduced to a certain extent, and a measured error can be reduced.

Figure 8:
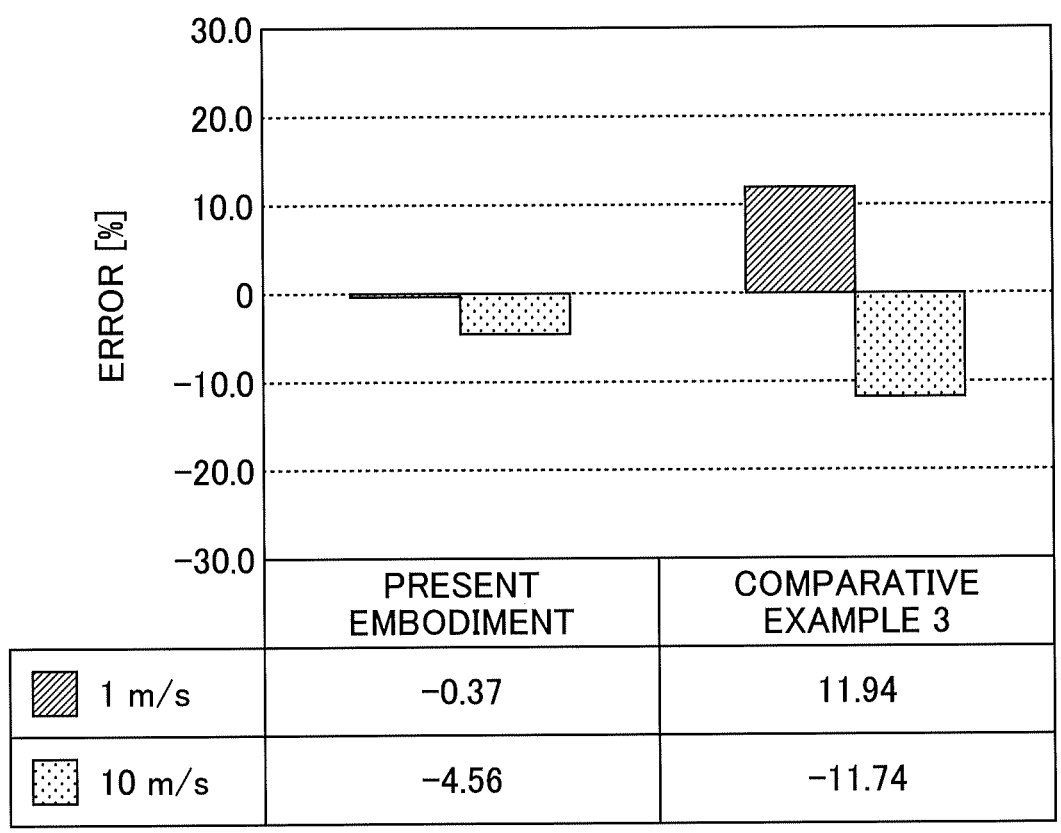
FIG. 8 is a graph illustrating an effect of a flange of the air flow measurement device according to the present embodiment.

FIG. 8 is a graph illustrating an effect of the flange 131 of the air flow measurement device 1 according to the present embodiment. In FIG. 8, in addition to a measurement result by the measurement device 1 according to the present embodiment, measurement results by another air flow measurement device not having a flange 131 are also illustrated as a comparative example 3. A vertical axis in FIG. 8 represents the measured error (%) caused by presence of a pillar. The measured errors in FIG. 8 are values which were obtained by actual measurement.

With respect to an air flow measurement device having the flange 131 according to the present embodiment, and an air flow measurement device according to the comparative example 3 not having a flange, a measured error when a flow velocity is 1 m/s and a calculation of a measured error when a flow velocity is 10 m/s were obtained.

Figure 9A:
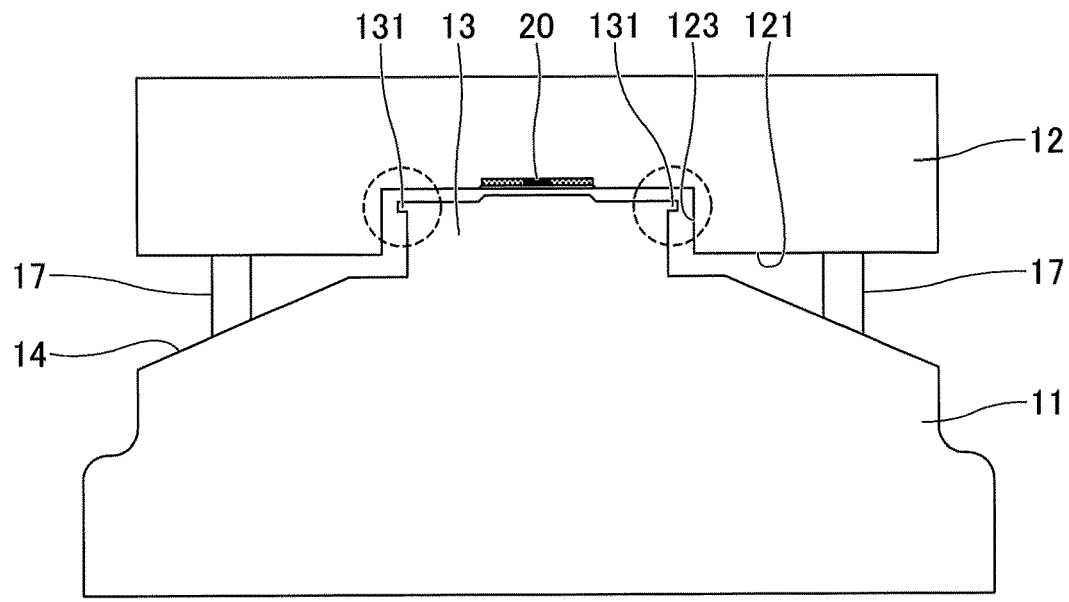
FIGS. 9A and 9B are schematic diagrams of two air flow measurement devices used in an actual measurement.
Figure 9B:
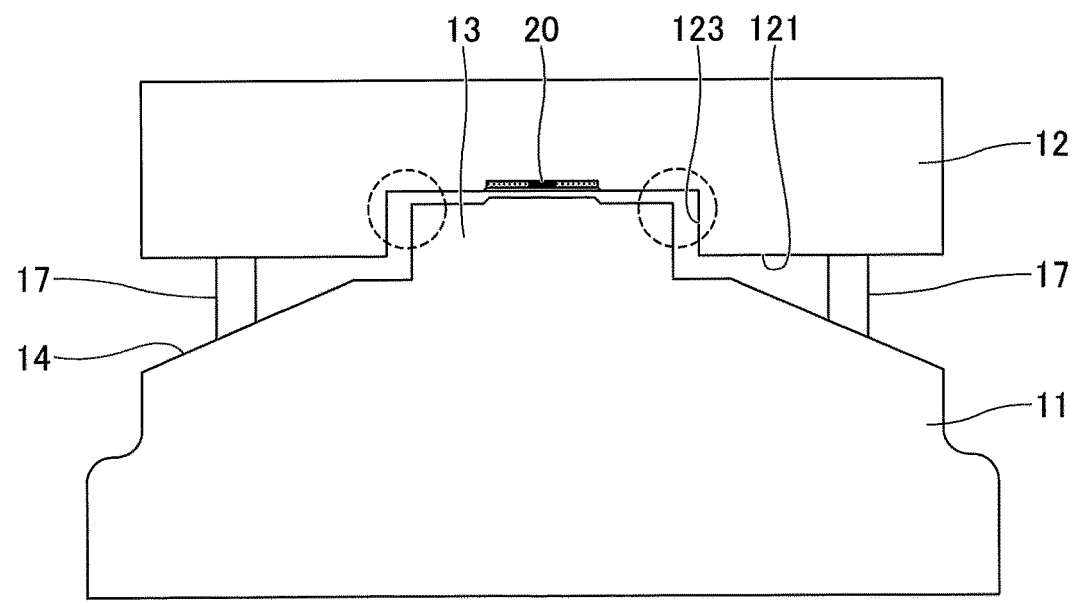

FIGS. 9A and 9B are schematic diagrams of two air flow measurement devices which have been used in the measurement in FIG. 8. FIG. 9A illustrates the air flow measurement device 1 having the flange 131 according to the present embodiment, and FIG. 9B illustrates the air flow measurement device according to the comparative example 3 not having a flange. Except for presence/absence of the flange 131, conditions of the above two air flow measurement devices are the same. Thus, all the air flow measurement devices illustrated in FIGS. 9A and 9B are equipped with slope structures. In both of the air flow measurement devices illustrated in FIGS. 9A and 9B, a size and a shape of a slanted channel, and a height and a diameter of a stage at a center are the same. Similar to FIG. 7A, FIG. 7B, or FIG. 7C, the pillars 17 are columns each having a diameter of 2 mm.

Referring back to FIG. 8, in the air flow measurement device 1 having the flange 131 according to the present embodiment, a measured error is close to 0% when a flow velocity is 1 m/s. Even when a flow velocity is 10 m/s, a measured error is within 5%. However, in the comparative example 3 (in the air flow measurement device in FIG. 9B), regardless of whether a flow velocity is 1 m/s or 10 m/s, a measured error exceeding 10% occurs.

According to the result illustrated in FIG. 8, by providing the flange 131 in combination with the slanted channel 15, the air flow measurement device 1 can reduce a measurement error caused by a variation of a flow velocity in all directions. Note that a configuration of the air flow measurement device in FIG. 6 having the slope structure and a configuration of the air flow measurement device in FIG. 8 having the flange 131 are the same configuration in that both of the slope structure and the flange 131 are present. However, the measured errors of the two air flow measurement devices are slightly different. The difference is caused by a difference between a simulation and an actual measurement.

Figure 10:
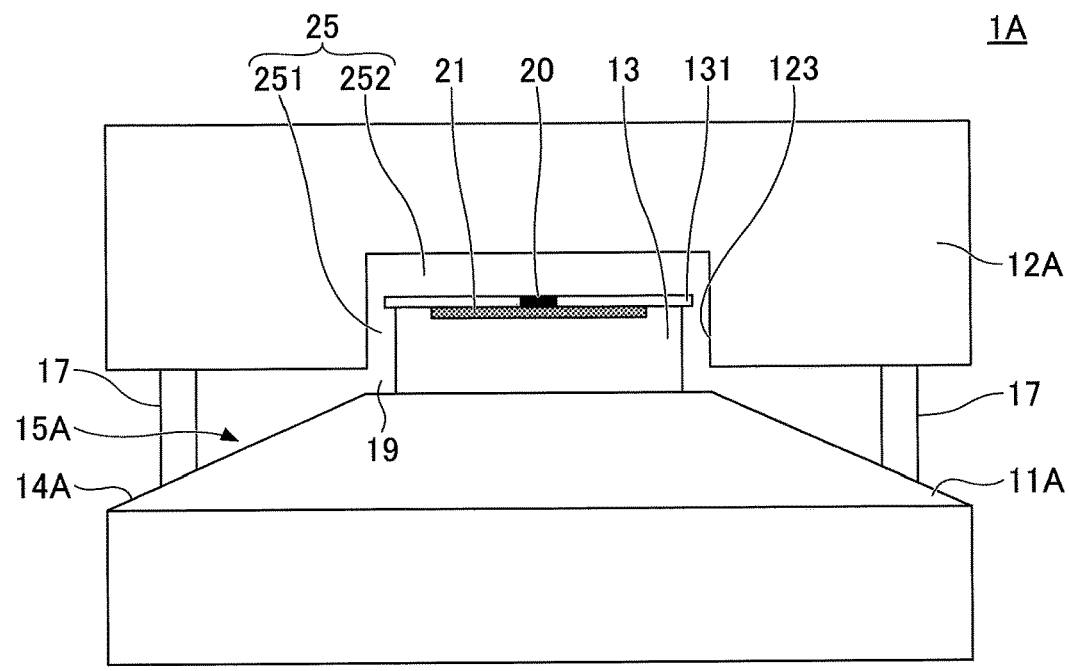
FIG. 10 is a diagram illustrating a modified example 1 of the air flow measurement device.

FIGS. 10 to 15 are diagrams illustrating modified examples of the air flow measurement device 1 according to the present embodiment. In FIG. 10, an air flow measurement device 1A of a modified example 1 is illustrated. In the air flow measurement device 1A, a slope 14A is formed on a first channel plate 11A, and a slanted channel 15A is formed at an outer side of the air flow measurement device 1A. At a center of the first channel plate 11A, a stage 13 having a flange 131 is disposed.

A branching passage 25 communicating with the slanted channel 15A and detouring around a flange 131 is formed. In the modified example 1, an air flow sensor 20 is disposed on an upper surface of the stage 13 and faces the branching passage 25. Similar to FIG. 2, the air flow sensor 20 is disposed above a communicating part 19 of the slanted channel 15A and the branching passage 25.

Also in this configuration, because of the slope 14A of the slanted channel 15A, velocity of air entering from all directions is equalized to a certain extent. Further, the incoming air reaches a horizontal path 252 after passing through a vertical path 251 and detouring around the flange 131. Accordingly, regardless of an incoming direction of air (whether air has entered between a gap of pillars 17 or air has entered by striking in front of the pillar 17), airflow is equalized, and an output error of the air flow sensor 20 is reduced.

Figure 11:
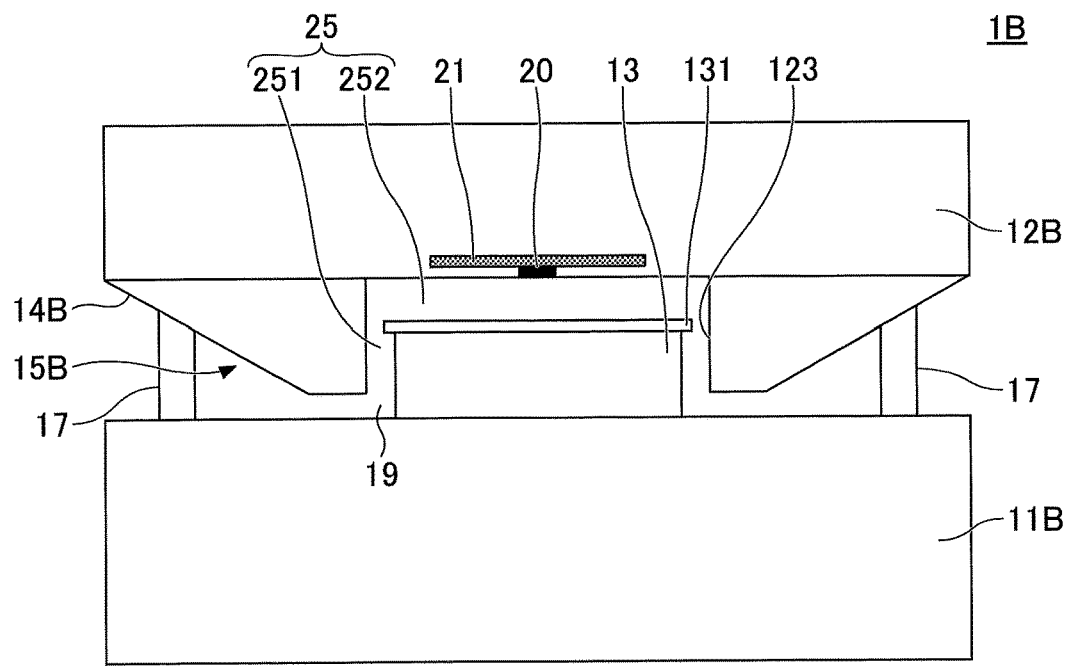
FIG. 11 is a diagram illustrating a modified example 2 of the air flow measurement device.

In FIG. 11, an air flow measurement device 1B of a modified example 2 is illustrated. In the air flow measurement device 1B, a slope is not formed on a first channel plate 11B. Instead, on a second channel plate 12B, a slope 14B is formed at an outer circumferential side of a recess 123. A slanted channel 15B is formed by the slope 14B on the second channel plate 12B and an upper surface of the first channel plate 11B.

Similar to FIG. 2, an air flow sensor 20 is disposed on the recess 123 such that a surface of the air flow sensor 20 is directed downward and faces a horizontal path 252 of a branching passage 25. Also in this configuration, similar to the configuration illustrated in FIG. 2 or FIG. 10, airflow introduced into the air flow sensor 20 is equalized in all directions, and a measured error caused by a variation of a flow velocity is reduced.

Figure 12:
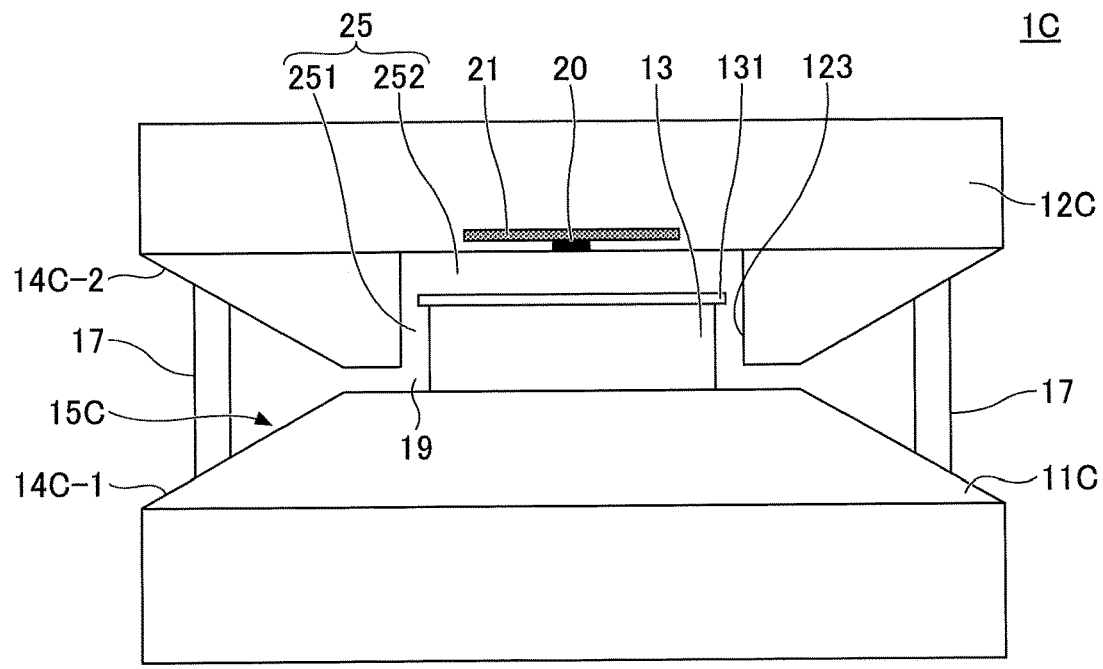
FIG. 12 is a diagram illustrating a modified example 3 of the air flow measurement device.

In FIG. 12, an air flow measurement device 10 of a modified example 3 is illustrated. In the air flow measurement device 10, a slope is formed on both a first channel plate 11C and a second channel plate 12C. The first channel plate 11C includes a slope 14C-1 at an outer circumferential side of a stage 13, and the second channel plate 12C includes a slope 14C-2 at an outer circumferential side of a recess 123. A slanted channel 15C is formed by the slope 14C-1 and the slope 14C-2.

An air flow sensor 20 is disposed on the recess 123 of the second channel plate 12C such that a surface of the air flow sensor 20 is directed downward and faces a horizontal path 252 of a branching passage 25. The air flow sensor 20 is disposed above a communicating part 19 of the slanted channel 15C and the branching passage 25.

In this configuration, a difference of a flow velocity caused by incoming directions of air flow with respect to a vertical direction, in addition to all circumferential directions, can be reduced. That is, regardless of whether air is introduced from upward or downward, airflow is equalized to a certain extent by the slope 14C-1 and the slope 14C-2. Further, airflow introduced from all circumferential directions is equalized by a flange 131. Accordingly, a measured error can be effectively reduced.

Figure 13:
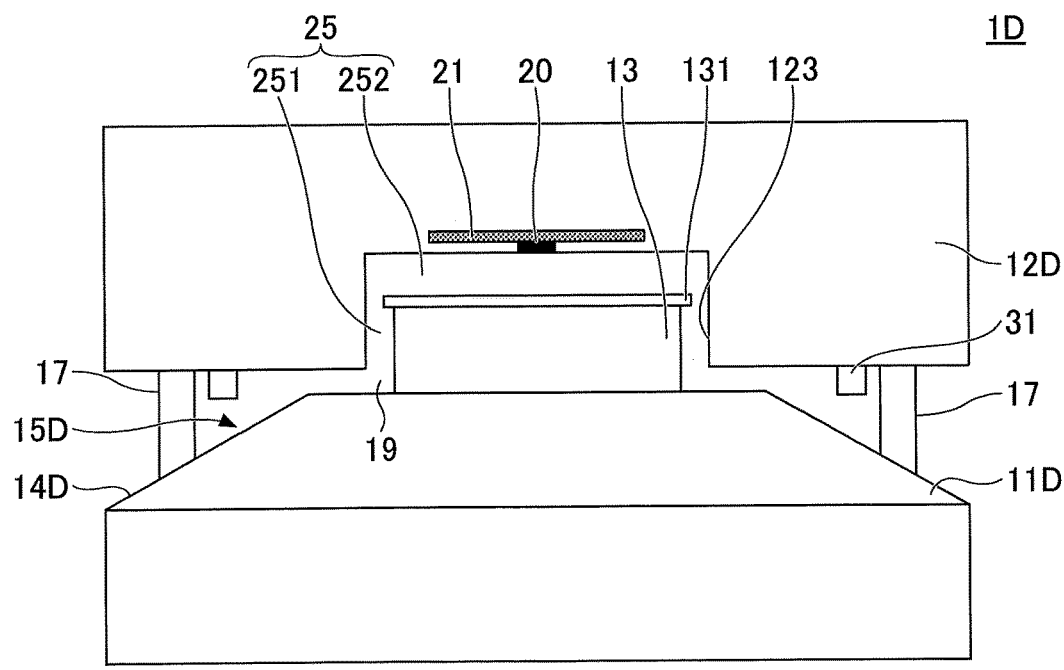
FIG. 13 is a diagram illustrating a modified example 4 of the air flow measurement device.

In FIG. 13, an air flow measurement device 1D of a modified example 4 is illustrated. In addition to the elements illustrated in FIG. 2, the air flow measurement device 1D includes an annular projection 31 projected in a slanted channel 15D. The annular projection 31 is arranged on a bottom surface of a second channel plate 12D, and extends downward.

A first channel plate 11D includes a slope 14D surrounding a stage 13. The slanted channel 15D is formed by the slope 14D and the bottom surface of the second channel plate 12D. A flange 131 is provided at a circumference of the stage 13.

The annular projection 31 can prevent dust or water droplets from entering inside of the air flow measurement device 1D, without hindering effect of equalization of airflow. Accordingly, a measuring accuracy of the air flow measurement device 1D can be maintained for a long time.

Figure 14:
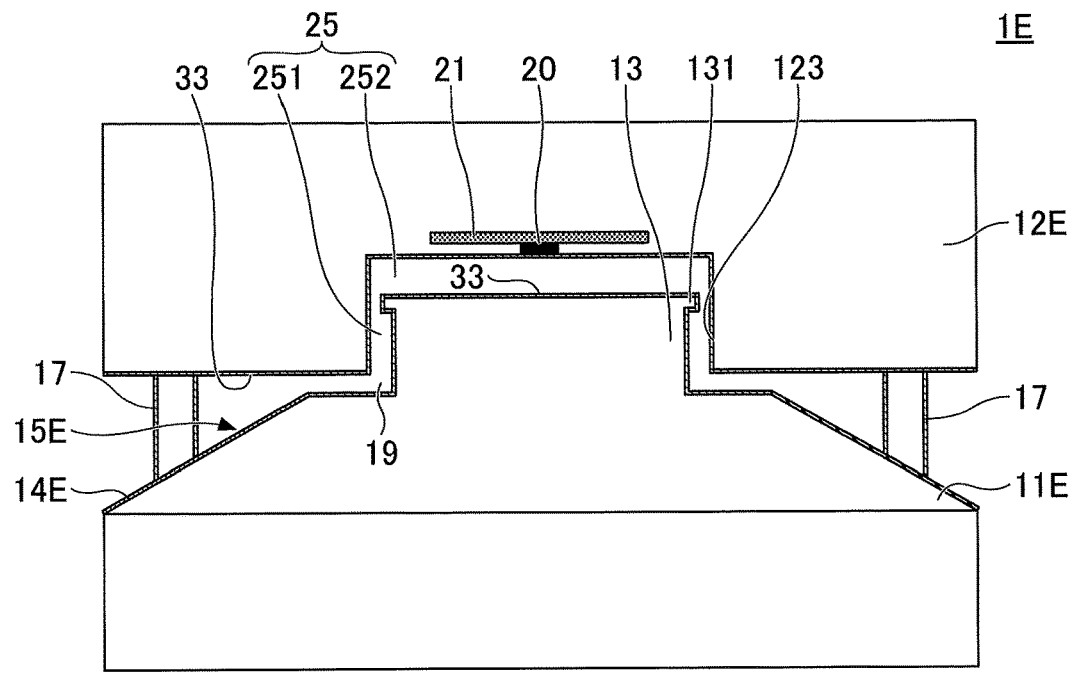
FIG. 14 is a diagram illustrating a modified example 5 of the air flow measurement device.

In FIG. 14, an air flow measurement device 1E of a modified example 5 is illustrated. In the air flow measurement device 1E, a water-repellent coating 33 is applied on a surface of an inflow/outflow passage with respect to an air flow sensor 20. Except for an element surface of the air flow sensor 20, an entire inner wall of a slanted channel 15E and an entire inner wall of a communicating part 19 and a branching passage 25 are covered with the water-repellent coating 33. According to the structure, influence of dust or water can be suppressed without hindering effect of reducing a measured error.

Figure 15:
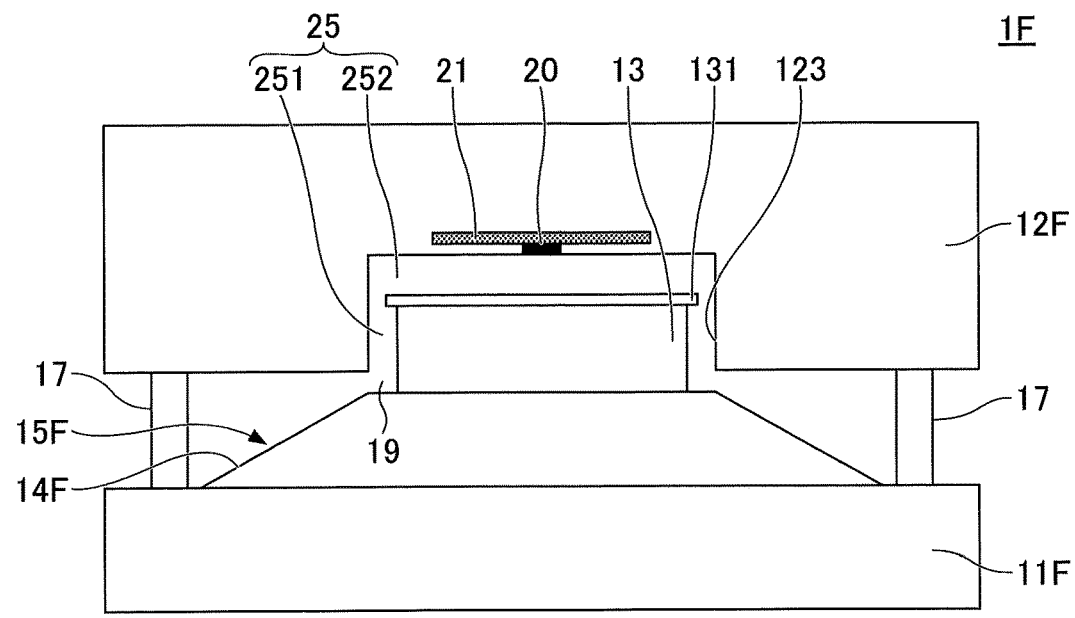
FIG. 15 is a diagram illustrating a modified example 6 of the air flow measurement device.

In FIG. 15, an air flow measurement device 1F of a modified example 6 is illustrated. In the air flow measurement device 1F, pillars 17 are arranged outside a slanted channel 15F. A first channel plate 11F includes a slope 14F which extends from an outer circumference of the slanted channel 15F (or a periphery of a region surrounded by the pillars 17) to a vicinity of a base of a stage 13. By arranging the pillars 17 outside the slanted channel 15F, the air flow measurement device 1F can be placed stably. Even if turbulence is caused by the pillar 17, a variation of velocity of air entering an air flow sensor 20 is reduced in all directions because of the slanted channel 15F and a flange 131 projected in a branching passage 25, and a measured error can be reduced. An air flow sensor 20 is disposed above a communicating part 19 of the slanted channel 15F and the branching passage 25, and air equalized by the slope 14F and the flange 131 is introduced into the air flow sensor 20.

Figure 16A:
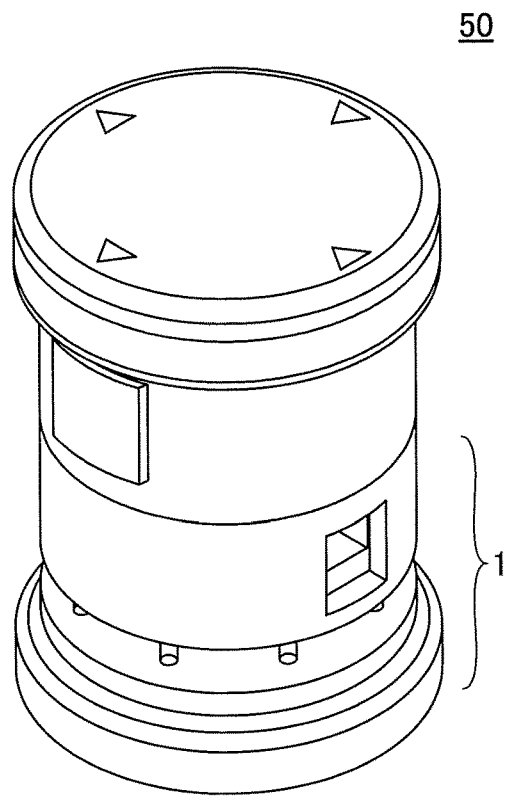
FIGS. 16A and 16B are schematic diagrams illustrating an environment measurement apparatus employing the air flow measurement device according to the present embodiment.
Figure 16B:
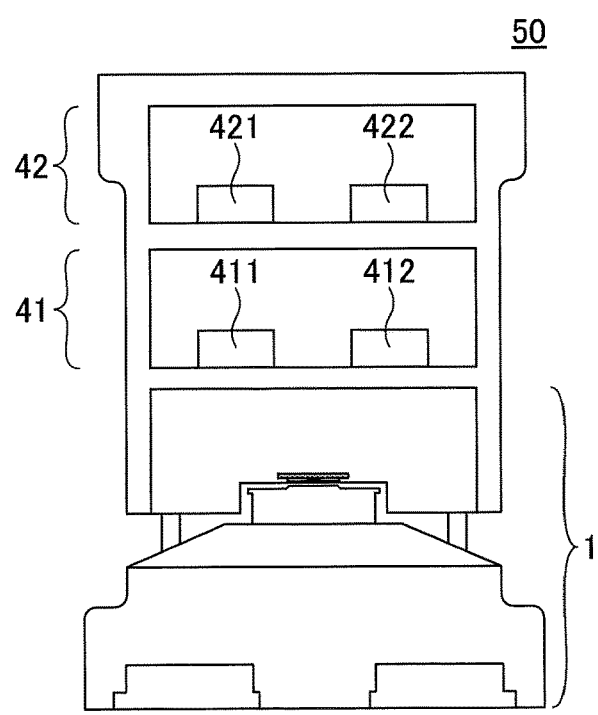

FIG. 16A and FIG. 16B are schematic diagrams illustrating an environment measurement apparatus 50 employing the air flow measurement device 1 (or 1A to 1F). FIG. 16A is a perspective view, and FIG. 16B is a cross sectional view.

In FIG. 16A and FIG. 16B, the air flow measurement device 1 is disposed at a lowermost step of the environment measurement apparatus 50. At a middle step 41, other sensors 411 and 412 are provided, and an electronic component 421, such as a communication module or a microprocessor, and a battery 422 are provided at an uppermost step 42. A configuration of the environment measurement apparatus 50 is not limited to an example illustrated in FIGS. 16A and 16B. For example, the other sensors 411 and 412 or the battery 422 may be provided at the lowermost step. Further, the communication module (an example of the electronic component 421) may be provided at the lowermost step, and may be connected to an antenna element provided at the uppermost step 42 with a wire provided along an inner wall of a housing.

The other sensors 411 and 412 are sensors for measuring environmental parameters other than a flow velocity. Examples of the other sensors 411 and 412 include a temperature sensor, a humidity sensor, an illuminance sensor, a pressure sensor, and a magnetometer. In combination with the air flow measurement device 1, by measuring various types of environmental parameters using the other sensors 411 and 412, multiple types of environmental information can be collected simultaneously.

In the above described embodiments, the present invention has been described by referring to specific examples. However, the present invention is not limited to the examples described in the above embodiments. For example, instead of the flange 131 extending horizontally in the branching passage 25, a projection extending vertically for narrowing the horizontal path 252 may be employed. Also, a shape of a surface of the first channel plate 11 or the second channel plate 12 is not limited to a circular shape, but may be a polygonal shape such as an octagon or a decagon. The pillar 17 is not limited to a column, but may be a prism. In this case, by disposing the prism such that an edge of the prism faces a direction of incoming air, effect of flow separation can be reduced. Although it is preferable that the stage 13 is cylindrical, even if a stage of a prism-like shape is employed, effect of equalization of air flow by a projection or a flange can be obtained, and effect of reducing a measured error can also be obtained.

The structures described in the modified examples 1 to 6 (FIGS. 10 to 15) can be appropriately combined. For example, the structure described in the modified example 4 (the annular projection 31 projected in the slanted channel 15D) may be applied to the other modified examples. The water-repellent coating 33 described in the modified example 5 may be applied to the other modified examples. Further, the configuration described in the modified example 6 in which the pillars 17 are arranged outside the slanted channel 15F may be applied to the other modified examples.

In the environment measurement apparatus 50, the air flow measurement device 1 is not necessarily disposed at a lowermost step. The environment measurement apparatus 50 may be configured such that the air flow measurement device 1 is disposed at an uppermost step and that other components such as other types of sensor elements and a radio communication module are disposed at lower steps.

The air flow measurement device according to the present embodiment at least measures a direction of air flow or a flow velocity. By multiplying the flow velocity by a cross-sectional area of an air flow channel, a flow rate can also be obtained. The air flow measurement device according to the present embodiment is compact and structurally stable. The air flow measurement device according to the present embodiment can also reduce a measured error of air flow in all directions caused by turbulence.

What is claimed is:

1. An air flow measurement device comprising:
   a first channel plate;
   a second channel plate arranged above the first channel plate so as to face the first channel plate;
   a pillar fixing the second channel plate with respect to the first channel plate so as to form a space of a given size between the first channel plate and the second channel plate;
   a slope formed on at least one of a surface of the first channel plate facing the second channel plate and a surface of the second channel plate facing the first channel plate;
   a slanted channel formed by the slope in the space, a cross section of the slanted channel becoming smaller toward a center portion of the air flow measurement device;
   a branching passage arranged in the center portion, the branching passage communicating with the slanted channel;
   a projection provided in the branching passage so as to partly narrow the branching passage; and
   an air flow sensor arranged at a position higher than a junction between the branching passage and the slanted channel such that a surface of the air flow sensor faces the space.

2. The air flow measurement device according to claim 1, further comprising a stage formed on the first channel plate, the stage being arranged at a location corresponding to the center portion, wherein the projection is a flange projected horizontally from the stage.

3. The air flow measurement device according to claim 2, further comprising a recess on the surface of the second channel plate facing the first channel plate, the branching passage being formed between the stage and the recess.

4. The air flow measurement device according to claim 1, wherein the branching passage includes a first part extending from the slanted channel in a height direction and a second part extending in a horizontal direction, and
the air flow sensor is disposed so as to face the second part.

5. The air flow measurement device according to claim 4, wherein the projection is positioned between the first part and the second part.

6. The air flow measurement device according to claim 1, further comprising an annular projection projecting in the slanted channel in a height direction.

7. The air flow measurement device according to claim 1, wherein a water-repellent coating is applied to the surface of the first channel plate facing the second channel plate and the surface of the second channel plate facing the first channel plate.

8. An environment measurement apparatus comprising:
an air flow measurement device including
a first channel plate;
a second channel plate arranged above the first channel plate so as to face the first channel plate;
a pillar fixing the second channel plate with respect to the first channel plate so as to form a space of a given size between the first channel plate and the second channel plate;
a slope formed on at least one of a surface of the first channel plate facing the second channel plate and a surface of the second channel plate facing the first channel plate;
a slanted channel formed by the slope in the space, a cross section of the slanted channel becoming smaller toward a center portion of the air flow measurement device;
a branching passage arranged in the center portion, the branching passage communicating with the slanted channel;
a projection provided in the branching passage so as to partly narrow the branching passage; and
an air flow sensor arranged at a position higher than a junction between the branching passage and the slanted channel such that a surface of the air flow sensor faces the space; and
at least one additional sensor configured to measure an environment parameter different from an environment parameter measured by the air flow sensor.

* * * * *